United States Patent
Connor

[15] 3,658,018
[45] Apr. 25, 1972

[54] SELF CENTERING SEED SHOE FOR DOUBLE DISK FURROW OPENER

[72] Inventor: Donald E. Connor, Plainfield, Ill.

[73] Assignee: International Harvester Company, Chicago, Ill.

[22] Filed: Mar. 23, 1970

[21] Appl. No.: 21,738

[52] U.S. Cl. .................... 111/88, 172/156, 172/556
[51] Int. Cl. ............. A01c 5/00, A01b 49/02, A01b 21/02
[58] Field of Search ............. 111/88, 87; 172/156, 575, 558, 172/579, 560

[56] References Cited

UNITED STATES PATENTS

| | | |
|---|---|---|
| 3,380,412 | 4/1968 | Conner et al. ............ 172/156 X |
| 799,022 | 9/1905 | Tunnicliff ............... 172/575 |
| 951,741 | 3/1910 | Pattison et al. ............ 172/558 X |

*Primary Examiner*—Robert E. Pulfrey
*Assistant Examiner*—Stephen C. Pellegrino
*Attorney*—Floyd B. Harman

[57] ABSTRACT

A furrow opener assembly for a planter includes a pair of forwardly converging disks and a self-centering furrow forming runner mounted between the disks to smooth the dirt passing between the disks, and to form a furrow in which seed is deposited. The runner is mounted for lateral pivoting between the inner faces of the disks and is secured to the frame between the disks by means which is removable from the rear without disturbing the disks.

12 Claims, 5 Drawing Figures

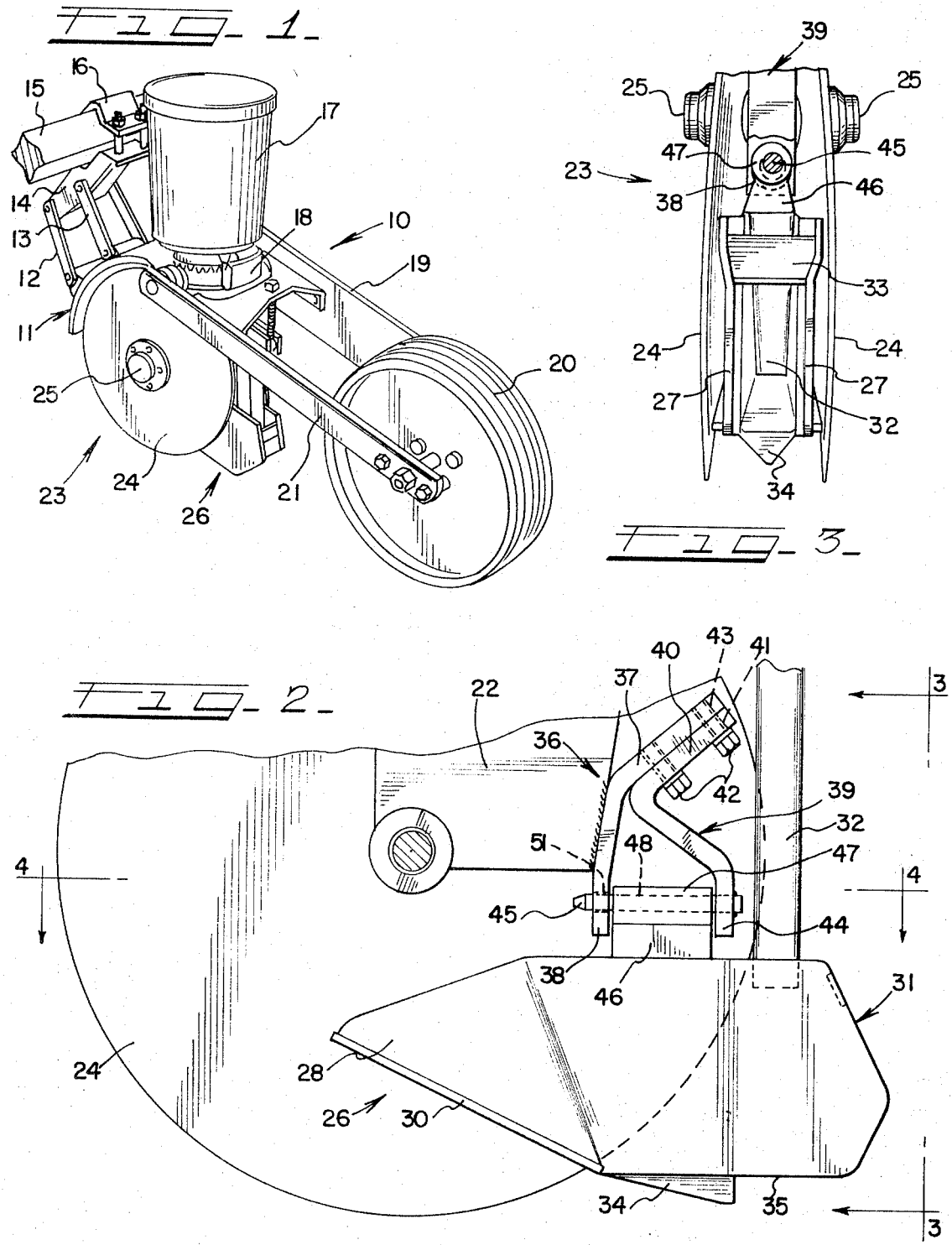

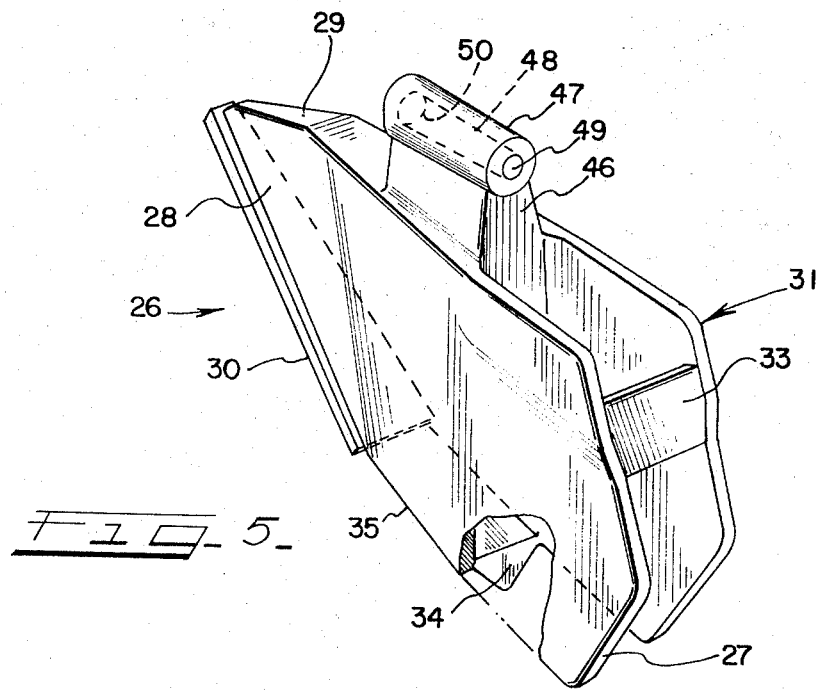
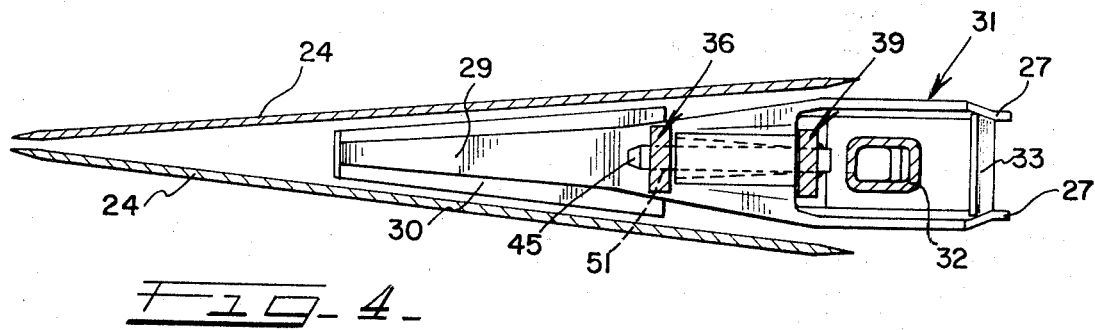

SELF CENTERING SEED SHOE FOR DOUBLE DISK FURROW OPENER

BACKGROUND OF THE INVENTION

This invention relates to planters and particularly to double disk furrow openers. More specifically, the invention concerns a runner attachment for a double disk furrow opener and means for mounting the runner between the disks.

It is known to mount a runner opener between the disks of a double disk furrow opener. A portion of the planter frame extends downwardly between the disks and the disks are mounted thereon to revolve on forwardly and outwardly directed axes so that the disks converge in the direction of travel and open a furrow in the ground. Depending on the kind of seed and the soil conditions it is frequently desirable for better control of the placement of seed in the furrow to attach a runner to the planter frame between the diverging rear portions of the disks to form a furrow and to guide the seed into it.

One of the principal disadvantages of previous double disk and runner combinations has been the tendency of the runner to become wedged to one side against the inner face of one or the other of the disks. Another disadvantage resided in the fact that to attach or remove the runner required the removal of at least one of the disks to expose the attaching means.

An important object of the present invention, therefore, is to provide a runner for a double disk furrow opener wherein the runner is free to swing laterally about a horizontal longitudinal axis and is thus self-centering and will not bind against the disks.

Another object of the invention is the provision of novel means for mounting a runner between the disks whereby the runner can be easily and quickly inserted between the diverging rear edges of the disks and attached to the frame and as easily removed therefrom.

Another object of the invention is the provision, in a double disk and runner furrow opener assembly, of a novel runner construction wherein, in addition to pivotally mounting the runner for lateral swinging about a longitudinal horizontal axis between the disks, the forward portion of the runner has an upwardly angled base portion shaped to conform generally to the angle of convergence of the disks and the runner mounting includes means by which the runner is pivotable about a vertical axis into scraping relation of said base portion with the inner faces of the disks to strip moist dirt therefrom and prevent build-up of dirt between the disks.

DESCRIPTION OF THE DRAWINGS

FIG. 1 is a perspective view of a typical planter unit showing the double disk and runner furrow opener assembly with which the present invention is concerned;

FIG. 2 is an enlarged detail of the double disk assembly with one disk removed and showing the runner attachment of this invention;

FIG. 3 is a sectional view taken on the line 3 — 3 of FIG. 2;

FIG. 4 is a section taken on the line 4 — 4 of FIG. 2; and

FIG. 5 is a perspective view, with a part broken away, of the runner separated from the mounting means.

DESCRIPTION OF THE PREFERRED EMBODIMENT

The planter unit in which the present invention is embodied is illustrated in FIG. 1 and designated by the numeral 10. The unit comprises a frame structure 11 to the forward end of which are connected vertically spaced generally parallel links 12 and 13 pivoted to a bracket 14 secured to a tool bar 15 by clamping means 16, the tool bar being adapted for mounting on a tractor.

The planter frame supports a seed hopper 17 and seed therein is metered and discharged to the ground by conventional mechanism designated at 18 operated by a suitable drive means such as sprocket and chain mechanism contained in a housing 19, from a ground drive wheel 20, in well known manner. Housing 19 and a link 21 serve to support wheel 20.

The planter frame includes a depending portion 22 upon which is mounted a furrow opener assembly 23 comprising a pair of forwardly converging earth penetrating disks 24 rotatably mounted on stub axles 25 the axes of which are angled forwardly and outwardly.

The runner furrow opener 26 of this invention comprises a pair of forwardly converging side plates 27 and has a forward portion 28 provided with a cover plate 29, the forward lower edges of side plates 27 being inclined at an angle upwardly and having affixed thereto a triangularly shaped base plate 30 the sides of which project laterally beyond the sides of plates 27 and conform generally to the triangular space between the forwardly converging disks 24.

The heel portion 31 of the runner receives the lower end of a seed tube 32 which extends downwardly from the hopper 17 to guide seed to the furrow, and the rear edges of the plates 27 are connected by a brace 33.

As the planter is propelled over the ground, soil penetrated by the disks 24 passes between the forwardly converging edges thereof and is smoothed by base plate 30. The earth thus smoothed is evened by the provision of a V-shaped earth penetrating member 34 secured between the horizontal lower edges 35 of side plates 27 rearwardly of base plate 30, member 34 forming a V-shaped furrow for the reception of seed discharged from seed tube 32.

Runner 26 is mounted on planter frame member 22 for lateral swinging movement about a horizontal axis extending in the direction of travel to allow the runner to center itself between the disks, by the provision of a bracket 36, forming part of the frame and affixed as by welding to the rear edge of member 22 and having an upper rearwardly angled part 37 and a depending leg 38.

A stationary runner supporting member in the form of a strap 39 has a rearwardly angled upper portion 40 engageable with part 37 and having openings 41 therein to receive generally longitudinally extending securing means in the form of bolts 42 and registrable with tapped openings 43 provided in part 37.

The lower portion of supporting member 39 angles rearwardly in the form of a yoke and has a downwardly bent leg portion 44 parallel to leg 38 of bracket 36. Supporting member 39 carries at its lower end a forwardly projecting generally horizontal pivot member in the form of a pin 45 having its rear end received in an opening in leg portion 44 and affixed to the latter by welding.

A block 46 formed between side plates 27 of runner 26 projects upwardly therefrom and has formed thereon a mating cylindrical bearing member 47 having a central bore 48 tapered forwardly from a cylindrical opening 49 at its rear end to an elliptical or oval outlet 50 having its long axis disposed transversely of the direction of travel of the planter, as shown in FIGS. 4 and 5.

With runner 26 and its support 39 disassembled from the planter unit, mounting of the runner on the frame between the disks is accomplished by sliding pivot member 45 in opening 48 in bearing 47 and advancing the runner and its support between the diverging rear edges of the disks 24 until the free end of pin 45 is received in an opening 51 provided in leg 38, the forward end of the pin being tapered to facilitate its insertion in bore 48 and opening 51. Bolts 42 are then threaded into openings 43 and secured. To remove the runner the reverse procedure is followed, bolts 42 being removed and support 39 with runner 26 withdrawn.

By its pivotal mounting on a generally horizontal axis extending in the direction of travel of the planter, runner 26 is free to swing laterally and to center itself between the disks 24. Further, the mounting of the runner on the frame includes a vertical pivot axis represented by the cylindrical rear opening 49 in bearing 47, allowing the forward portion of the runner to swing laterally, within the limits defined by the oval opening 50 in the forward end of bearing 47, into scraping relation to the disks with the laterally projecting edges of base plate 30 adapted to strip away dirt clinging to the inner faces of the disks.

What is claimed is:

1. In a planter having a traveling supporting frame, a pair of laterally spaced forwardly converging earth penetrating disks rotatably mounted on the frame, a self-centering runner disposed between the disks rearwardly of the axes thereof, and means for mounting said runner on the frame between said disks for lateral pivoting about a longitudinal horizontal axis, said mounting means including means for lateral pivoting of said runner about a vertical axis.

2. The invention set forth in claim 1, wherein the means for mounting said runner on the frame comprises a supporting member having means for securing its upper end to the frame, a forwardly extending pivot pin affixed at its rear end to the lower end of the supporting member, and said runner having bearing means with a longitudinally elongated opening therein to slidably receive said pivot pin.

3. The invention set forth in claim 2, wherein said opening in said bearing means is cylindrical at its rear end and diverges forwardly to provide an elliptical opening accommodating said lateral pivoting of the runner about a vertical axis represented by the rear end of said bearing means.

4. In a planter having a traveling supporting frame, a seed tube for discharging seed to the ground, a pair of laterally spaced forwardly converging earth penetrating disks rotatably mounted on the frame forwardly of the seed tube, a self-centering furrow forming runner disposed between the disks to groom a path for seed discharged from the tube, and means between the disks for mounting said runner on the frame for free lateral swinging movement thereof comprising, a supporting member disposed between said disks rearwardly of the axes thereof, relatively stationary horizontal pivot means mounted on said supporting member and extending longitudinally therefrom, mating pivot means on said runner pivotally mounted on said relatively stationary pivot means, and securing means accessible from the rear between the diverging edges of said disks for removably securing said supporting member to the frame.

5. The invention set forth in claim 4, wherein one of said pivot means is rotatably received in the other of said pivot means and means for pivoting said runner about a vertical axis.

6. The invention set forth in claim 4, wherein said securing means comprises threaded bolt means carried by said supporting member, said frame having a tapped opening therein to receive said bolt means.

7. The invention set forth in claim 6, wherein said supporting member has an upper portion carrying said bolt means and a lower portion spaced rearwardly from said frame, and said relatively stationary pivot means is affixed to and extends forwardly from said lower portion of said relatively stationary pivot means.

8. The invention set forth in claim 4, wherein said relatively stationary pivot means is a pivot pin affixed at its rear end to said supporting member and extending forwardly therefrom and said mating pivot means is a bearing member on said runner having an opening therethrough to slidably receive said pin.

9. The invention set forth in claim 8, wherein the free end of said pivot pin projects forwardly from said bearing member, said frame having an opening therein to receive and support the forward end of said pin.

10. The invention set forth in claim 9, wherein said pivot pin is cylindrical and the opening in said bearing member is cylindrical at its rear end and tapers forwardly to form an elliptical outlet the long axis of which is transverse to the direction of travel of the planter to accommodate lateral movement of the forward end of the runner about a vertical axis represented by the rear end of said bearing opening.

11. The invention set forth in claim 10, wherein the forward portion of said runner angles upwardly and has affixed thereto a base plate having forwardly converging side edges and laterally shiftable about said vertical axis into scraping relation with the inner faces of said disks to prevent the accumulation of dirt thereon.

12. The invention set forth in claim 11, wherein said base plate engages and smooths dirt passing between the forwardly converging edges of said disks, and a V-shaped foot is affixed to the runner rearwardly of said base plate to form a seed receiving furrow in the earth smoothed by said base plate.

* * * * *